United States Patent
Stavig, Jr. et al.

(10) Patent No.: US 9,168,592 B1
(45) Date of Patent: Oct. 27, 2015

(54) LIMITED VERTICAL ACCESS DRILLING MACHINE

(75) Inventors: Paul N. Stavig, Jr., Puyallup, WA (US); Stephen F. Thompson, Black Diamond, WA (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 13/585,617

(22) Filed: Aug. 14, 2012

(51) Int. Cl.
| | |
|---|---|
| *B23B 45/04* | (2006.01) |
| *B23B 45/00* | (2006.01) |
| *B23Q 5/04* | (2006.01) |
| *B25H 1/00* | (2006.01) |

(52) U.S. Cl.
CPC .............. *B23B 45/008* (2013.01); *B23Q 5/046* (2013.01); *B25H 1/0021* (2013.01); *Y10T 408/557* (2015.01); *Y10T 408/5626* (2015.01); *Y10T 408/6757* (2015.01)

(58) Field of Classification Search
CPC ..... B23B 45/008; B25H 1/0021; B23Q 5/046
USPC ............. 408/79, 80, 87, 95, 97, 99, 100, 124, 408/130
See application file for complete search history.

(56) References Cited

U.S. PATENT DOCUMENTS

| | | | | |
|---|---|---|---|---|
| 2,271,717 | A | * | 2/1942 | Schwartz ........................... 408/7 |
| 3,060,769 | A | * | 10/1962 | Heider ............................. 408/95 |
| 3,217,567 | A | * | 11/1965 | Bullard, III et al. .............. 408/4 |
| 3,518,901 | A | * | 7/1970 | Wright ........................... 408/146 |
| 3,526,158 | A | * | 9/1970 | Adams et al. .................... 408/97 |
| 3,679,320 | A | * | 7/1972 | Bohorquez et al. ............. 408/99 |
| 4,679,969 | A | * | 7/1987 | Riley ............................... 408/87 |
| 4,890,962 | A | * | 1/1990 | Nydegger ........................ 408/14 |
| 4,948,308 | A | * | 8/1990 | Giannuzzi et al. .............. 408/97 |
| 5,888,032 | A | * | 3/1999 | Jensen ........................... 408/1 R |
| 7,258,512 | B2 | * | 8/2007 | Morrison et al. ............. 408/1 R |

FOREIGN PATENT DOCUMENTS

GB     1218012 A  *  1/1970

OTHER PUBLICATIONS

Cooper Tools, "In-Line Positive Feed Tools Advanced Drilling Equipment," Cooper Industries, Ltd., www.cooperindustries.com, SP-1300-1-EN-0109, pp. 1-44, 2009.

* cited by examiner

*Primary Examiner* — Daniel Howell
*Assistant Examiner* — Chwen-Wei Su

(57) ABSTRACT

A positive-feed drill motor assembly includes a positive-feed motor, a gearbox, and a drill-bit. The positive-feed motor includes the spindle which rotates around a spindle axis and simultaneously translates in a direction parallel to the spindle axis. The gearbox includes a plurality of gears rotated by the spindle. The plurality of gears is configured to engage and rotate a drill-bit around a drill-bit axis which is offset from the spindle axis. The gearbox and a drill-bit attached thereto are configured to simultaneously translate with the spindle in the direction parallel to the spindle axis as the spindle rotates around the spindle axis.

15 Claims, 4 Drawing Sheets

LIMITED VERTICAL ACCESS DRILLING MACHINE

FIELD OF THE DISCLOSURE

The disclosure relates to positive-feed drilling machines.

BACKGROUND OF THE DISCLOSURE

Positive-feed drilling machines simultaneously feed (or translate) the drill-bit as it rotates to drill a hole in a part. Typically, positive-feed drilling machines require two times the length of the drill-bit in vertical clearance. This is due to the fact that the spindle of the positive-feed drilling machine is in-line with the drill-bit. This can be problematic when a hole needs to be drilled in a part having limited vertical access.

A positive-feed drilling machine is needed which will overcome one or more issues of one or more of the current positive-feed drilling machines.

SUMMARY OF THE DISCLOSURE

In one embodiment, a positive-feed drill motor assembly includes a positive-feed motor, a gearbox, and a drill-bit. The positive-feed motor includes the spindle which rotates around a spindle axis and simultaneously translates in a direction parallel to the spindle axis. The gearbox includes a plurality of gears rotated by the spindle with the plurality of gears configured to engage and rotate a drill-bit around a drill-bit axis which is offset from the spindle axis. The gearbox and a drill-bit attached thereto are configured to simultaneously translate with the spindle in the direction parallel to the spindle axis as the spindle rotates around the spindle axis.

In another embodiment, a positive-feed drill motor assembly includes a positive-feed motor, a gearbox, and a drill-bit. The positive-feed motor includes the spindle which rotates around a spindle axis and simultaneously translates in a direction parallel to the spindle axis. The gearbox includes a plurality of gears, each having a different axis of rotation, including a driving gear rotated by the spindle, at least one intermediary gear rotated by the driving gear, and a driven gear rotated by the at least one intermediary gear. The driven gear is configured to rotate a drill-bit around a drill-bit axis which is offset from the spindle axis. The clamp includes an upper clamp arm and a lower clamp arm which move relative to one another. The gearbox and a drill-bit attached thereto are configured to simultaneously translate with the spindle in the direction parallel to the spindle axis as the spindle rotates around the spindle axis.

In still another embodiment, a method of drilling is disclosed. In one step, a spindle of a positive-feed motor is rotated around a spindle axis. In another step, a plurality of gears of a gearbox is rotated with the spindle. In an additional step, a drill-bit is rotated with the plurality of gears around a drill-bit axis which is offset from the spindle axis. In yet another step, the spindle, the gearbox, and the drill-bit are simultaneously translated in a direction parallel to the spindle axis as the spindle rotates around the spindle axis.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
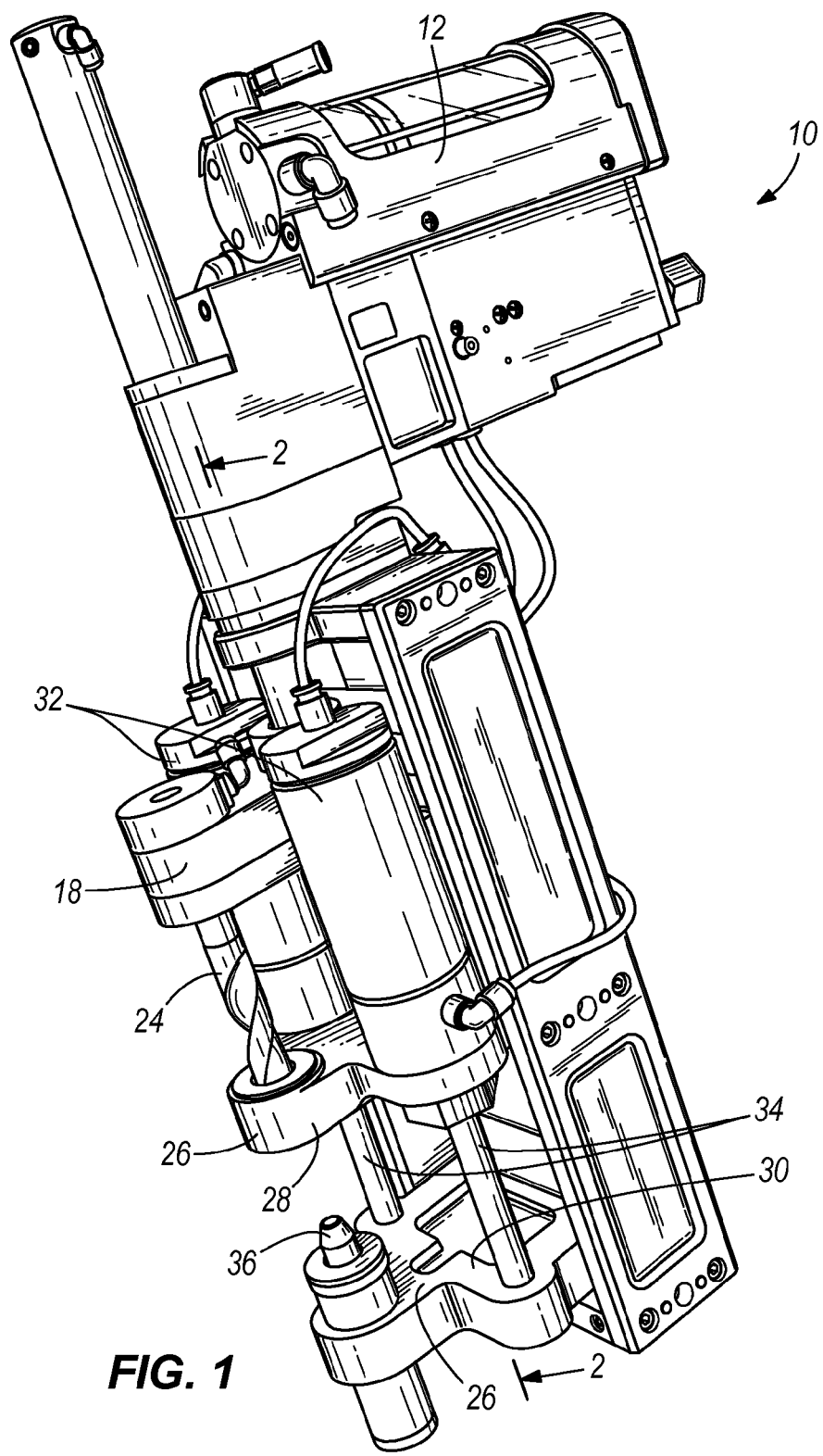
FIG. 1 illustrates a perspective view through one embodiment of a positive-feed drill motor assembly.
Figure 2:
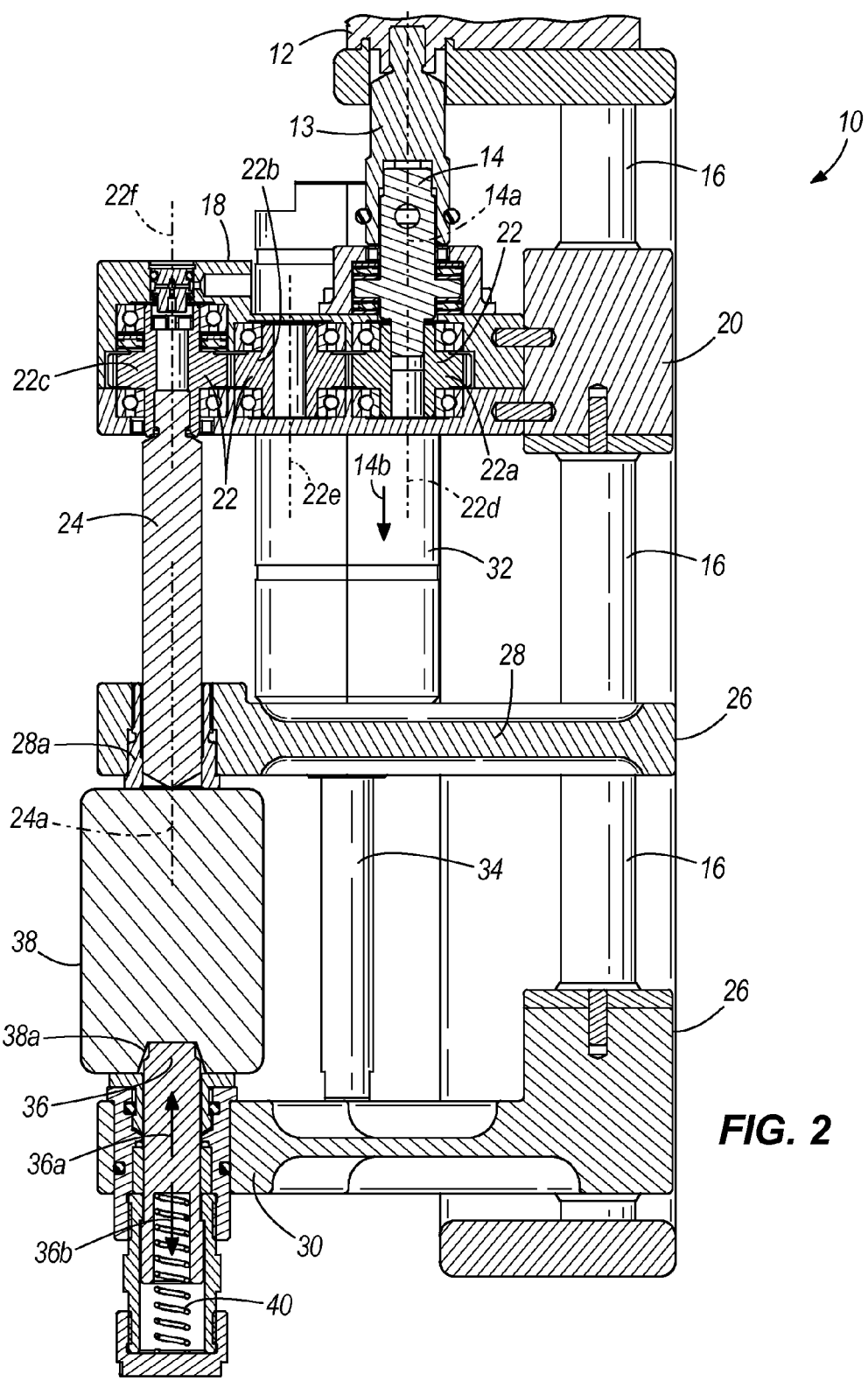
FIG. 2 illustrates a cross-section view through line 2-2 of the embodiment of FIG. 1.

FIG. 1 illustrates a perspective view through one embodiment of a positive-feed drill motor assembly 10. FIG. 2 illustrates a cross-section view through line 2-2 of the embodiment of FIG. 1. As shown collectively in FIGS. 1 and 2, the positive-feed drill motor assembly 10 comprises a positive-feed motor 12, a foot attachment 13, a spindle 14, a plurality of rails 16 (only one of which is shown), a gearbox 18, a plurality of bearings 20 (only one of which is shown), a plurality of gears 22, a drill-bit 24, a clamp 26, an upper clamp arm 28, a lower clamp arm 30, a plurality of pneumatic cylinders 32, a plurality of moveable rods 34, and a pilot-hole finder 36.

The positive-feed motor 12 rotates the spindle 14 around a spindle axis 14$a$ and simultaneously translates the spindle 14 in a direction 14$b$ parallel to the spindle axis 14$a$. The positive-feed motor 12 may comprise an off-the-shelf right-angle positive-feed motor made by Lubbering under model #KL-57. In other embodiments, the positive-feed motor 12 may comprise any type of positive-feed motor known to those of ordinary skill in the art. The positive-feed motor 12 is connected to the spindle 14 with the foot attachment 13. The spindle 14 is attached to the gearbox 18. The gearbox 18 comprises the plurality of gears 22 rotated by the spindle 14. The gears 22 comprise a driving gear 22$a$, at least one intermediate gear 22$b$, and a driven gear 22$c$, each having different axis of rotation 22$d$, 22$e$, and 22$f$. In the embodiment of FIGS. 1 and 2, the gearbox 18 comprises exactly three gears 22 comprising exactly one driving gear 22$a$, exactly one intermediate gear 22$b$, and exactly one driven gear 22$c$, however in other embodiments the gearbox 18 may comprise any number of gears 22.

The driving gear 22$a$ is rotated by the spindle 14, the at least one intermediate gear 22$b$ is rotated by the driving gear 22$a$, and the driven gear 22$c$ is rotated by the at least one intermediate gear 22$b$. The driven gear 22$c$ rotates the drill-bit 24 around a drill-bit axis 24$a$ which is offset from the spindle axis 14$a$. The spindle axis 14$a$ is aligned with the axis of rotation 22$d$ of the driving gear 22$a$. The gearbox 18 further comprises the plurality of bearings 20 (only one of which is shown) moveably attached to the plurality of rails 16 (only one of which is shown). In other embodiments, the positive-feed drill motor assembly 10 may comprise any number of bearings 20 or rails 16. The plurality of bearings 20 may comprise linear bearings or other types of bearings. As the spindle 14 is rotated around the spindle axis 14$a$ and simultaneously translates in the direction 14$b$ parallel to the spindle axis 14$a$, the gearbox 18 and the drill-bit 24 simultaneously translate with the spindle 14 in the direction 14$b$ parallel to the spindle axis 14$a$ due to the plurality of bearings 20 (only one of which is shown) of the gearbox 18 translating in direction 14b along the plurality of rails 16 (only one of which is shown).

The clamp 26 comprises the upper clamp arm 28 and the lower clamp arm 30 which move relative to one another. The upper clamp arm 28 is fixed in position relative to the rails 16 (only one of which is shown). The upper clamp arm 28 comprises a hole 28a through which the drill-bit 24 extends into, and may later retract from, as the drill-bit 24 simultaneously rotates and translates. The lower clamp arm 30 is moveably attached to the rails 16 (only one of which is shown) with the lower clamp arm 30 configured to move along the rails 16 in the direction 14b. The pneumatic cylinders 32 are attached to the plurality of moveable rods 34 which are attached to the lower clamp arm 30. The clamp 26 is powered by the pneumatic cylinders 32. The pneumatic cylinders 32 are adapted to extend and retract the moveable rods 34 to move the lower clamp arm 30 towards the upper clamp arm 28 to clamp a part 38 and to move the lower clamp arm 30 away from the upper clamp arm 28 to unclamp the part 38. In other embodiments, any number of pneumatic cylinders 32 and moveable rods 34 may be used.

The clamp 26 further comprises the pilot-hole finder 36. The pilot-hole finder 36 is biased in direction 36a with spring 40. When the pilot-hole finder 36 is disposed in a first position, in which the spring 40 is extended extending the pilot-hole finder 36 into a pilot-hole 38a of the part 38, the pilot-hole finder 36 may be pneumatically connected to the positive-feed motor 12 to start the positive-feed motor 12 or to allow the positive-feed motor 12 to be started. When disposed in this same first position, the pilot-hole finder 36 may be pneumatically connected to the clamp 26 to begin clamping the part 38 with the lower clamp arm 30 moving towards the upper clamp arm 28 against the part 38. When the pilot-hole finder 36 is disposed in a second position, in which the spring 40 is compressed due to the drill-bit 24 drilling through the part 38 contacting and compressing the pilot-hole finder 36 in direction 36b thereby compressing the spring 40 in direction 36b, the pilot-hole finder 36 may be pneumatically connected to the positive-feed motor 12 to turn off the positive-feed motor 12 or to allow the positive-feed motor 12 to be turned off. When disposed in this same position, the pilot-hole finder 36 may be pneumatically connected to the clamp 26 to retract the clamp 26 from the part 38 by moving the lower clamp arm 30 away from the upper clamp arm 28 to unclamp the part 38.

Figure 3:
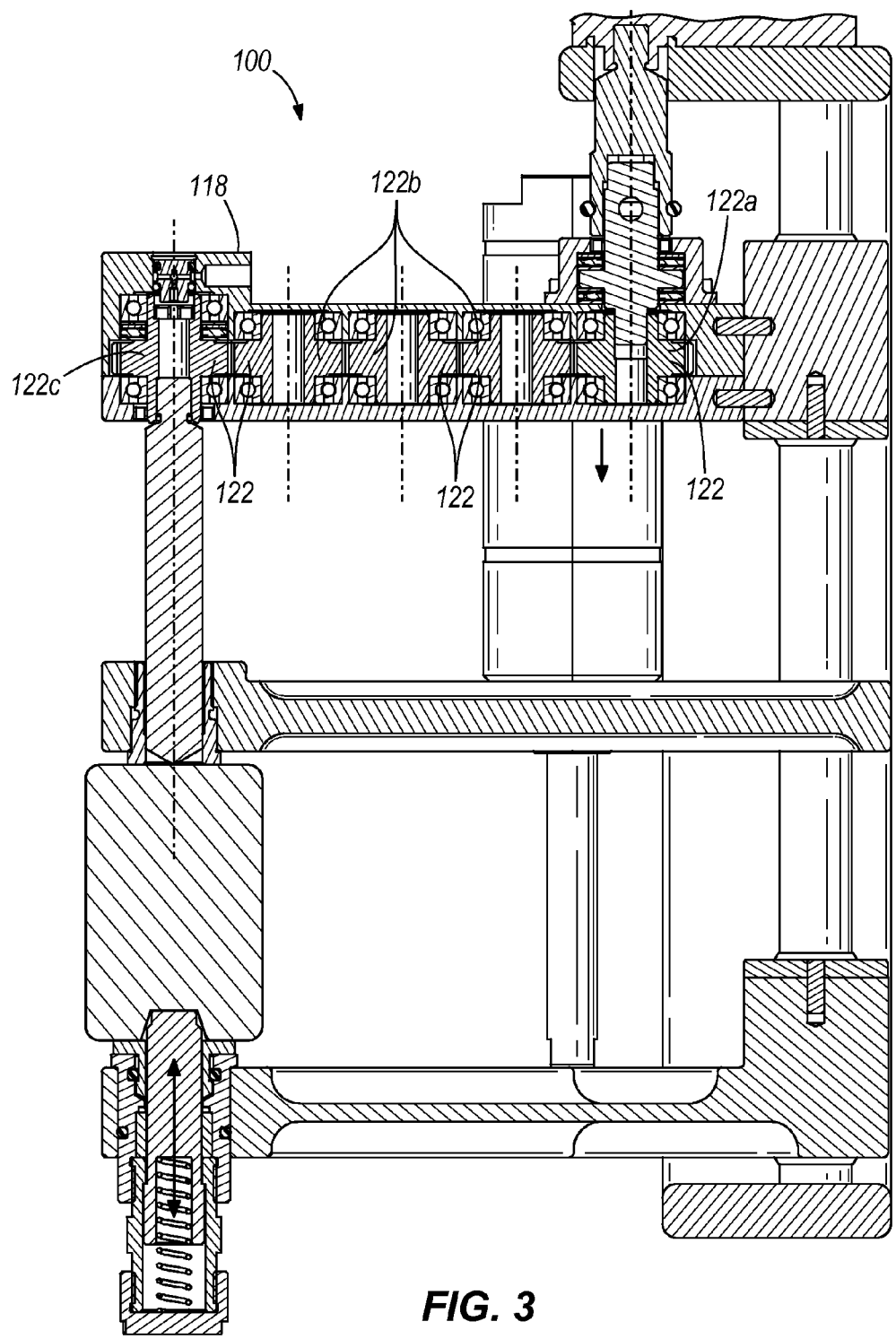
FIG. 3 illustrates a cross-section through another embodiment of a positive-feed drill motor assembly.

FIG. 3 illustrates a cross-section through another embodiment of a positive-feed drill motor assembly 100 having a gearbox 118 comprising a plurality of gears 122 comprising one driving gear 122a, three intermediate gears 122b, and a driven gear 122c. In the embodiment of FIG. 3, there are exactly five gears 122 comprising exactly one driving gear 122a, exactly three intermediate gears 122b, and exactly one driven gear 122c. However in other embodiments the gearbox 118 may comprise any number of gears 122.

Figure 4:
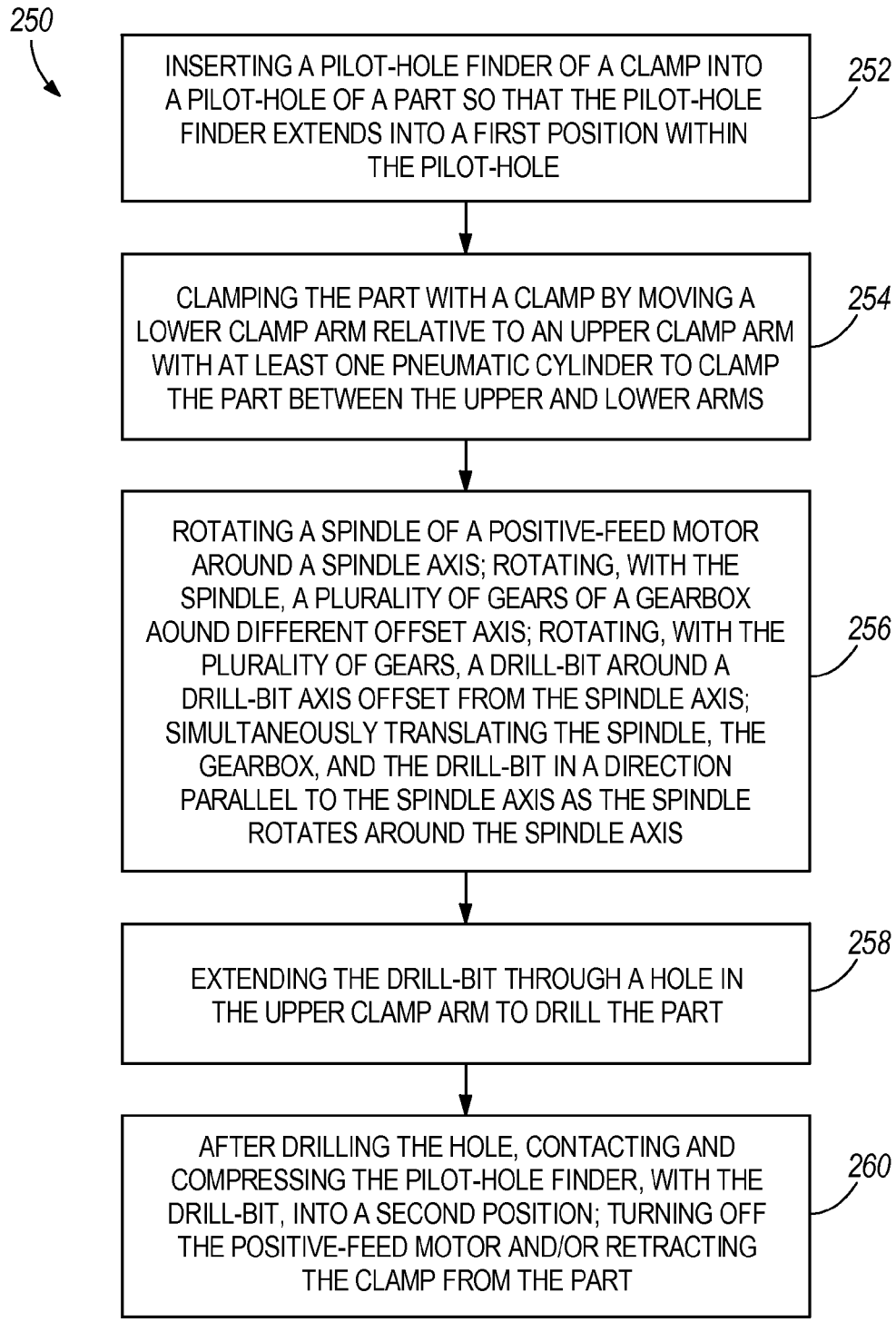
FIG. 4 is a flowchart of one embodiment of a method of drilling.

FIG. 4 is a flowchart of one embodiment of a method 250 of drilling. The method 250 may utilize any of the embodiments disclosed in FIGS. 1-3 or any of the embodiments detailed in the above description. In step 252 a pilot-hole finder of a clamp may be inserted into a pilot-hole of a part so that the pilot-hole finder extends into a first position within the pilot-hole of the part. When the pilot-hole finder is disposed in this first position, a positive-feed motor may be started or a clamp may begin clamping the part. In step 254 a clamp clamps the part. This may comprise moving a lower clamp arm relative to an upper clamp arm with at least one pneumatic cylinder to clamp the part between the lower and upper clamp arms.

In step 256 a spindle of a positive-feed motor may be rotated around a spindle axis; a plurality of gears of a gearbox may be rotated with the spindle around different offset axis; a drill-bit may be rotated with the plurality of gears around a drill-bit axis which is offset from the spindle axis; and the spindle, the gearbox, and the drill-bit may be simultaneously translated in a direction parallel to the spindle axis as the spindle rotates around the spindle axis. Step 256 may further comprise at least one bearing of the gearbox translating over at least one rail. In one embodiment, the gearbox may comprise exactly three gears. In another embodiment, the gearbox may comprise exactly five gears.

In step 258 the drill-bit may be extended through a hole in the upper clamp arm to drill the part. In step 260 after drilling a hole in the part the drill-bit may contact and compress the pilot-hole finder into a second position. When the pilot-hole finder is disposed in this second position, the positive-feed motor may be turned off or the clamp may be retracted from the part. In other embodiments, one or more of the steps of the method 250 may be modified in substance or in order, not followed, or one or more additional steps may be added.

One or more embodiments of the disclosure may reduce or eliminate one or more issues experienced by one or more of the current positive-feed drilling machines by reducing the vertical clearance required to drill a hole in a part, or by reducing or eliminating one or more other issues.

It should be understood, of course, that the foregoing relates to exemplary embodiments of the disclosure and that modifications may be made without departing from the spirit and scope of the disclosure as set forth in the following claims.

We claim:

1. A positive-feed drill motor assembly comprising:
a positive-feed motor comprising a spindle which rotates around a spindle axis and simultaneously translates in a direction parallel to the spindle axis;
a gearbox comprising a plurality of gears rotated by the spindle, said plurality of gears configured to engage and rotate a drill-bit around a drill-bit axis which is offset from the spindle axis; and
a clamp comprising a pilot-hole finder, and an upper clamp arm and a lower clamp arm which move relative to one another, wherein when the pilot-hole finder is disposed in a first position the pilot-hole finder starts the positive-feed motor or begins clamping with the clamp and when the pilot-hole finder is disposed in a second position the pilot-hole finder turns off the positive-feed motor or retracts the clamp;
wherein the gearbox and a drill-bit attached thereto are configured to simultaneously translate with the spindle in the direction parallel to the spindle axis as the spindle rotates around the spindle axis.

2. The positive-feed drill motor assembly of claim 1 wherein the gearbox comprises three gears with a first gear being rotated by the spindle, a second gear being rotated by the first gear, and a third gear being rotated by the second gear with the third gear configured to engage and rotate a drill-bit around a drill-bit axis which is offset from the spindle axis.

3. The positive-feed drill motor assembly of claim 1 wherein the gearbox comprises five gears with a first gear being rotated by the spindle, a second gear being rotated by the first gear, a third gear being rotated by the second gear, a fourth gear being rotated by the third gear, and a fifth gear being rotated by the fourth gear with the fifth gear configured to engage and rotate a drill-bit around a drill-bit axis which is offset from the spindle axis.

4. The positive-feed drill motor assembly of claim 1 wherein the gearbox further comprises at least one bearing which is moveably attached to at least one rail.

5. The positive-feed drill motor assembly of claim 1 wherein the upper clamp arm comprises a hole through which the drill-bit extends into, the upper clamp arm is fixed in position to at least one rail, and the lower clamp arm is moveably attached to the at least one rail.

6. The positive-feed drill motor assembly of claim 1 wherein the clamp is powered by at least one pneumatic cylinder.

7. A positive-feed drill motor assembly comprising:
a positive-feed motor comprising a spindle which rotates around a spindle axis and simultaneously translates in a direction parallel to the spindle axis;
a gearbox comprising a plurality of gears, each having a different axis of rotation, comprising a driving gear rotated by the spindle, at least one intermediary gear rotated by the driving gear, and a driven gear rotated by the at least one intermediary gear, the driven gear configured to rotate a drill-bit around a drill-bit axis that is offset from the spindle axis; and
a clamp comprising an upper clamp arm and a lower clamp arm which move relative to one another;
wherein the clamp further comprises a pilot-hole finder which when disposed in a first position starts the positive-feed motor or begins clamping with the clamp and when disposed in a second position the pilot-hole finder turns off the positive-feed motor or retracts the clamp;
wherein the gearbox and a drill-bit attached thereto are configured to simultaneously translate with the spindle in the direction parallel to the spindle axis as the spindle rotates around the spindle axis.

8. The positive-feed drill motor assembly of claim 7 wherein the gearbox comprises one driving gear, one intermediary gear, and one driven gear.

9. The positive-feed drill motor assembly of claim 7 wherein the gearbox comprises one driving gear, three intermediary gears, and one driven gear.

10. The positive-feed drill motor assembly of claim 7 wherein the gearbox further comprises at least one bearing which is moveably attached to at least one rail.

11. The positive-feed drill motor assembly of claim 7 wherein the upper clamp arm comprises a hole through which the drill-bit extends into, the upper clamp arm is fixed in position to at least one rail, and the lower clamp arm is moveably attached to the at least one rail.

12. The positive-feed drill motor assembly of claim 7 wherein the clamp is powered by at least one pneumatic cylinder.

13. A method of drilling comprising:
moving an upper clamp arm and a lower clamp arm of a clamp relative to one another to clamp a part between the upper clamp arm and the lower clamp arm;
rotating a spindle of a positive-feed motor around a spindle axis;
rotating a plurality of gears of a gearbox with the spindle;
rotating a drill-bit with the plurality of gears around a drill-bit axis which is offset from the spindle axis;
simultaneously translating the spindle, the gearbox, and the drill-bit in a direction parallel to the spindle axis as the spindle rotates around the spindle axis; and
starting the positive-feed motor or beginning clamping the part with the clamp when a pilot-hole finder is disposed in a first extended position in a pilot-hole of the part and turning off the positive-feed motor or retracting the clamp from the part when the pilot-hole finder is disposed in a second compressed position as a result of the drill-bit contacting and compressing the pilot-hole finder after drilling through the part.

14. The method of claim 13 further comprising extending the drill-bit through a hole in the upper clamp arm and drilling into the part.

15. The method of claim 13 further comprising moving the lower clamp arm relative to the fixed upper clamp arm with at least one pneumatic cylinder.

* * * * *